UNITED STATES PATENT OFFICE.

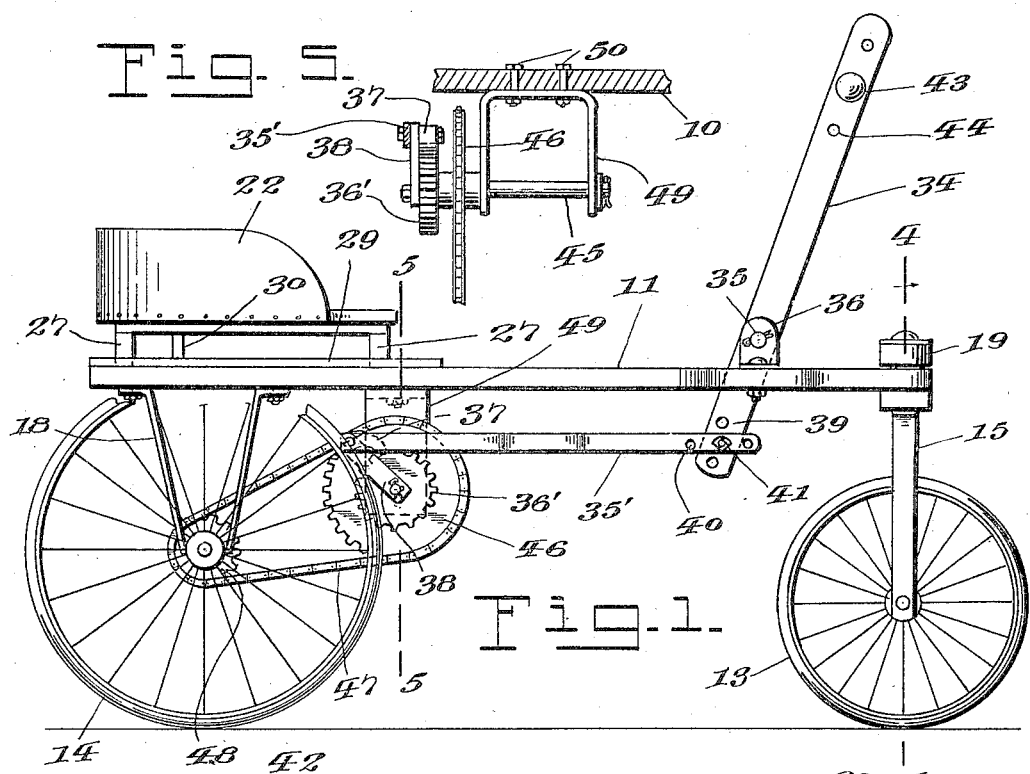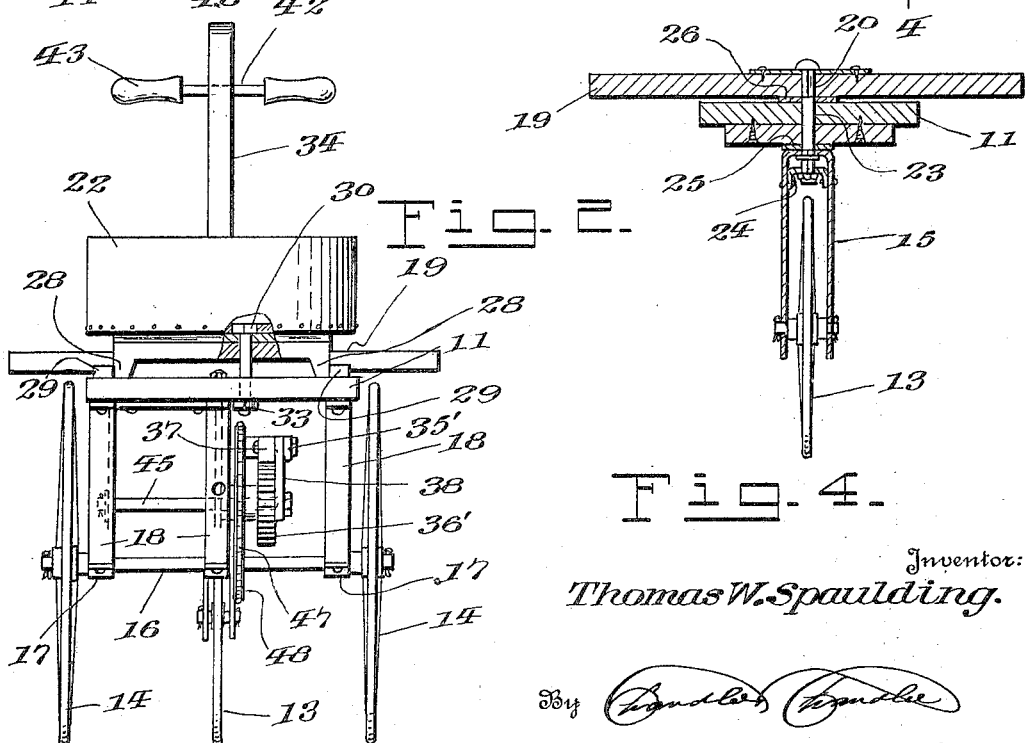

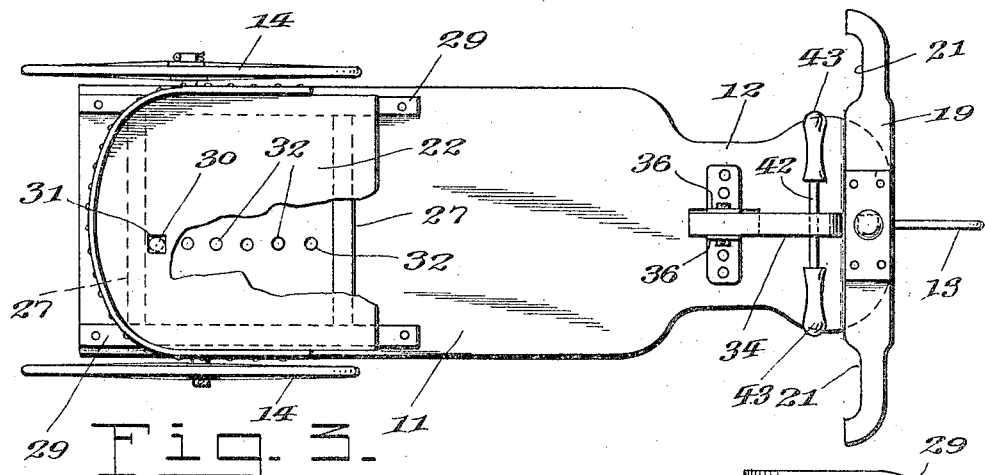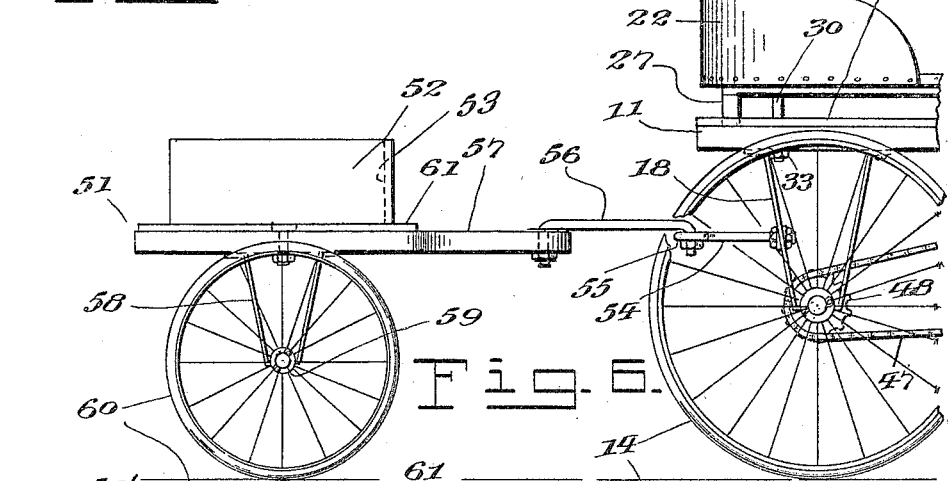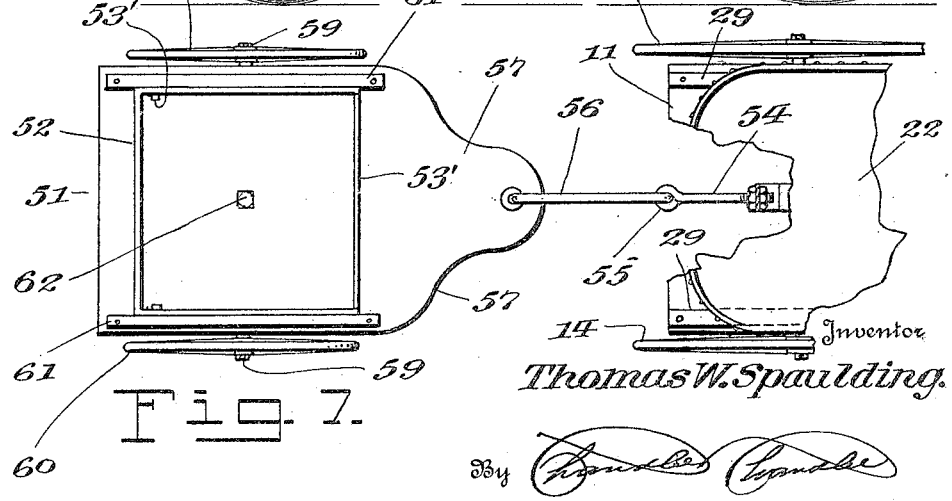

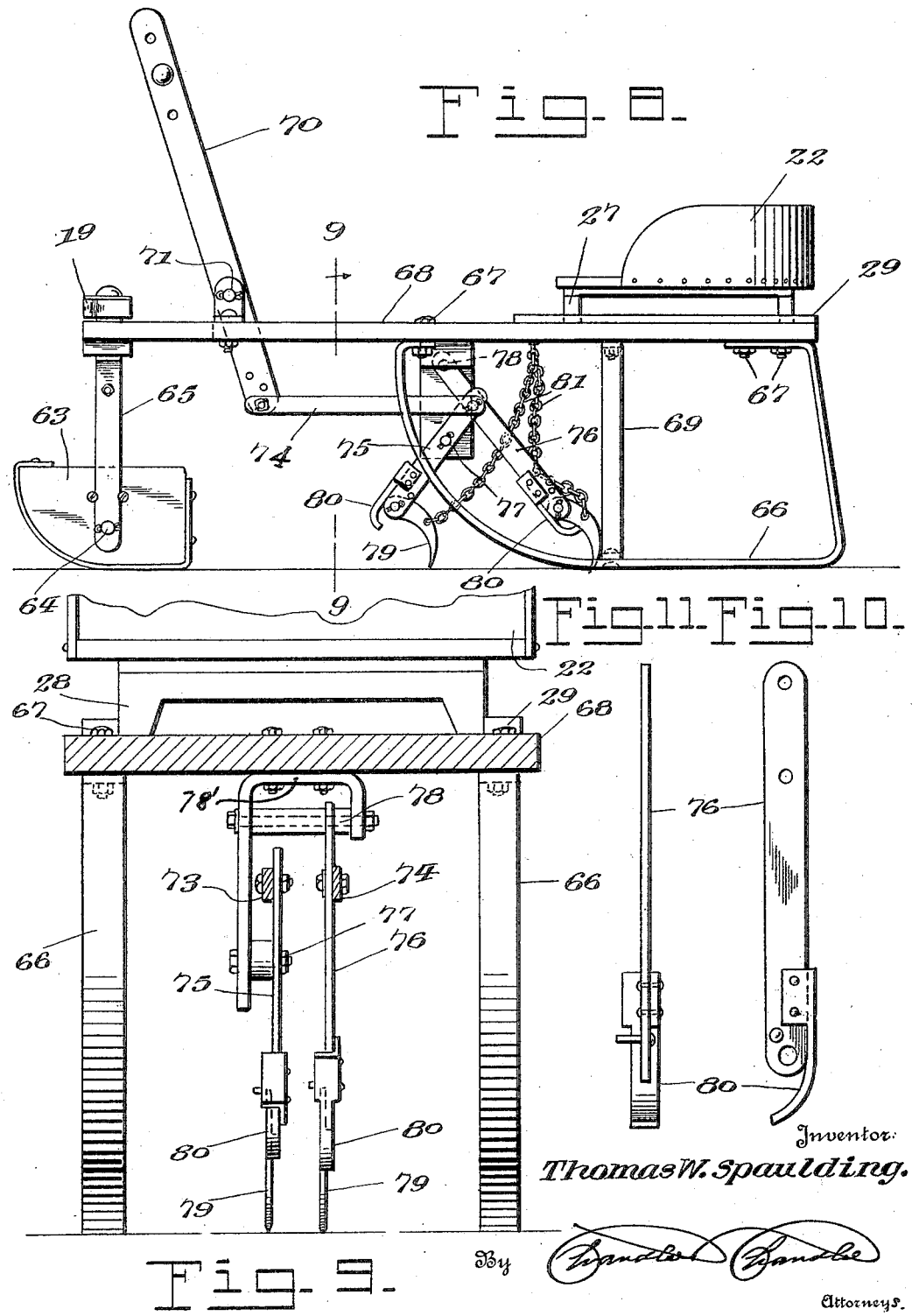

THOMAS W. SPAULDING, OF BALTIMORE, MARYLAND, ASSIGNOR TO SPAULDING SKI-KAR COMPANY, INC., OF BALTIMORE, MARYLAND, A CORPORATION OF MARYLAND.

TOY VEHICLE.

1,400,917.  Specification of Letters Patent.  Patented Dec. 20, 1921.

Application filed February 21, 1921. Serial No. 446,653.

*To all whom it may concern:*

Be it known that I, THOMAS W. SPAULDING, a citizen of the United States, residing at Baltimore, in the State of Maryland, have invented certain new and useful Improvements in Toy Vehicles; and I do hereby declare the following to be a full, clear, and exact description of the invention, such as will enable others skilled in the art to which it appertains to make and use the same.

The object of the invention is to provide a toy vehicle interchangeably adapted for coasting and propulsion by the occupant through conveniently operable means adjustable to the size, strength and convenience of the operator and suitable in general construction to be provided with either sliding or rolling supports, that is to say either runners or wheels to adapt it to the surface to be transversed.

A further object of the invention is to provide a vehicle of the type indicated wherein the driving mechanism for use by the occupant in propelling the same is of such simple construction as to adapt it to perform its intended function without the risk of disarrangement or injury by reason of the relatively rough usage to which such devices are subjected by reason of the inexperience of the operator, and which moreover shall be operative in all positions of the driving or actuating lever, or which in other words, shall have no dead center, as distinguished from those driving devices ordinarily used in connection with toy vehicles, which embody a crank which is subjected to locking upon a dead center unless the operating means such as the hand lever is of duplex form.

A further object of the invention is to provide a vehicle adapted for the purposes indicated to which may be attached, and which in its completed form may include, a trailer as a supplemental load carrier designed if preferred for an additional passenger, under such conditions as to minimize the risk of overturning or laterally tilting the trailing member to the discomfiture of the occupant thereof.

With these and related and supplemental objects in view as will appear hereinafter, the invention consists in a construction, combination and relation of parts of which a preferred embodiment is illustrated in the accompanying drawings wherein:

Figure 1 is a side view of a wheel supported vehicle embodying the invention.

Fig. 2 is a rear view partly broken away of the same.

Fig. 3 is a plan view, also shown partly broken away.

Fig. 4 is a vertical sectional view of the steering apparatus taken on the plane indicated by the line 4—4 of Fig. 1.

Fig. 5 is a detail vertical sectional view of the rotary driving mechanism as applied to the wheel supported form of the vehicle on the plane indicated by the line 5—5 of Fig. 1.

Fig. 6 is a side view of a portion of the vehicle illustrated in Fig. 1, with a trailer applied thereto, and showing the preferred means whereby the connection of the trailer to the main vehicle is effected.

Fig. 7 is a plan view partly broken away of the construction illustrated in Fig. 6.

Fig. 8 is a side view of the vehicle provided with sliding supports or runners as distinguished from the rolling supports or wheels employed in the embodiment of the invention shown in Figs. 1 to 7 inclusive.

Fig. 9 is a vertical sectional view to show the driving mechanism, taken on the plane indicated by the line 9—9 of Fig. 8.

Figs. 10 and 11 are respectively side and rear views of one of the walking elements entering into the construction of the driving mechanism illustrated in Figs. 8 and 9.

The car consists essentially of a base or platform 11 of a length suitable for the purpose and preferably of one-piece construction, which is reduced at its forward end as indicated in Fig. 3 to form a neck 12 and which is provided at its front and rear ends with supporting means which in the form of the invention illustrated in Figs. 1 to 7 inclusive, consists of a steering wheel 13 and a plurality of main wheels 14 of which the former is carried by a swiveled steering yoke 15 while the latter are mounted upon spindles at the extremities of a rear axle 16 mounted in bearings 17 supported from the base or platform 11 by means of hangers 18 which are of looped form with their arms arranged in upwardly divergent relation to afford the necessary front and rear pressing action to insure the stability of the vehicle. The operation of the steering yoke is adapted to be effected through the agency of a transverse steering bar 19 attached to the upper end of the spindle 20 of the steering yoke (as shown clearly in Fig. 4) and fitted upon a squared or cross sectionally irregular portion of said spindle, which in the construction illustrated, consists of a bolt, said steering bar having terminal foot rests 21 which are accessible by the feet of the operator, occupying a seat 22 by reason of the transversely reduced front portion of the base or platform 11.

The bolt forming the spindle of the steering yoke 15 is rounded to occupy the bearing 23 formed in the front end of the base or platform and is squared or of cross sectionally irregular form at its lower end for engagement with the fork, which is preferably provided with spaced webs 24 engaging the bolt and respectively engaged by nuts threaded upon the bolt, the upper web being arranged in contact with a bearing washer 25, while a similar washer 26 is interposed between the steering bar and the upper surface of the base or platform.

The seat 22 is provided with a carrier having front and rear transverse chairs 27 consisting of bars having terminal pendant feet 28 adapted to bear upon the base or platform between parallel longitudinal guide bars 29 supported by said base, so that the seat is movable longitudinally of the base to suit the reach of the operator of the vehicle, suitable means being provided to lock the seat in its adjusted positions and which means may, for example consist of a bolt 30 having its head arranged in a suitable depression or countersink 31 in the floor of the seat, and a series of openings 32 in the base or platform for selective engagement by said bolt which is provided at its lower end with a nut 33 for contact with the under surface of the base or platform.

The operating element of the driving mechanism consists of a hand lever 34 fulcrumed as at 35 between upstanding ears 36 on the base or platform near its forward end, and the lower end of this operating member is connected, below the plane of the base or fulcrum, by means of a pitman 35' with the driving mechanism which in the construction illustrated in Figs. 1 and 2 consists of a ratchet wheel 36' engaged by a pawl 37 carried by a link 38, and both as to position and length of throw the operating lever is adjustable with relation to the pitman, by providing the former with a series of openings 39 and the latter with a series of openings 40 for respectively selective engagement of a pivot bolt 41, so that the leverage of the operating lever may be modified,—that is to say increased or diminished with a corresponding reduction or increase in the throw of the pitman, and thereby the effective length of the pitman may be varied and the operating lever disposed in a zone of operation which is best suited to the occupant of the seat or the convenience of the operator. As a further means of adapting the device to drivers of different sizes the transverse handle 42 with which the operating lever is provided and which carries the terminal grips 43 is adapted for selective engagement with a plurality of transverse openings 44 in said lever.

The shaft 45 to which the ratchet wheel 36' is attached, and which receives motion from the link 38 through the pawl 37, and which is actuated as above indicated by the pitman 35', carries a sprocket wheel 46 connected by a chain 47 with a sprocket wheel 48 on the rear axle to communicate propelling power to the drive wheels, the said shaft preferably being carried by a looped bracket 49 depending from the under surface of the base or platform, as indicated in Fig. 5, and is secured thereto by bolts 50.

In order that a trailer 51 may be connected with the vehicle as above described as a means of carrying either packages or an additional passenger, to which end it is provided with a box or receptacle 52 having a foldable member 53 adapted to be extended as indicated by the dotted lines in Fig. 6 to form an auxiliary seat, there is attached to the intermediate rear wheel hanger 18 a draft rod 54 from a terminal eye 55 from which is extended a draft link 56 connecting with the front end of the base or platform 57 of the trailer and from which depend the brackets 58 for the axle 59 of the ground wheels 60. The box or receptacle 52 is mounted on the base or platform between guide strips 61 similar to those used in connection with the seat structure of the main vehicle to provide for the substantial attachment thereof through the agency of a single securing bolt 62 which obviously permits of the removal of the box or receptacle when not required. The extension of the draft rod 54 rearwardly to a terminal position approximately in the plane of the rear edge of the base or platform of the main vehicle, as indicated in Figs. 6 and 7, provides in connection with the loose intermediate link 56 for a dragging movement of the trailer which serves to guard against or minimize the tendency to tilting or lateral inversion of the trailer.

In the modified construction illustrated in Figs. 8 and 9 the body of the car embodies in substance the features hereinbefore described in connection with the form of the vehicle which is wheel supported and differs therefrom mainly in the use of a steering sled or bob 63 having a pivotal connection as at 64 with the arms of the steering fork 65 corresponding in construction with the steering fork 15 of the wheel supported type of car and rear runners 66, each of which consists of a single strap or bar of metal terminally attached as by bolts 67 to the under side of the base or platform 68 and strengthened intermediately by a vertical brace 69.

As in the previously described form of the vehicle, the propelling mechanism is actuated by a single hand lever 70 fulcrumed as at 71 and connected with the propelling mechanism by pitmen 73 and 74 (see Fig. 9) for attachment to the walking bars 75 and 76 which are respectively fulcrumed at 77 and 78 to the respective arms of a hanger 78' to constitute levers respectively of the first and third orders, and which at their free lower ends carry pivotal shoes 79 which are terminally reduced or sharpened for engagement with the surface traversed by the vehicle, as for example, ice or snow, said shoes also preferably being of crescent or arcuate form with the concaved side directed downwardly and forwardly to insure an effective engagement of the sharpened terminals thereof with the surface traversed throughout the range of oscillatory movement of the walking bars by which they are respectively carried. These walking bars also preferably carry trip fingers 80 designed as will be noted by reference particularly to Fig. 8, to raise the surface engaging terminal of the shoe out of engagement with the surface at the limit of the rearward stroke of the walking bar. Limiting chains 81 are also preferably connected with the shoes to prevent the latter from swinging forward beyond an operative or engaging position when the walking bar carrying the same is at the forward limit of its oscillatory movement, as for example should there be a depression in the surface traversed tending to permit an undesirable freedom of swinging movement of the shoe. Ordinarily in traversing a substantially plane or lever surface the position of the shoe carried by the forward walking bar will be substantially as indicated in Fig. 8, in proper relation with the surface of the road or pavement to properly engage and permit of giving a forward impulse to the vehicle through the actuation of the hand lever.

What is claimed is:

A toy vehicle having a base or platform provided with front and rear supports, of which the former includes a steering fork, means for actuating the steering fork to control the direction of progress of the vehicle, a seat supported by the base or platform near its rear end, propelling mechanism located beneath the base or platform, and actuating devices for the propelling means including a hand lever mounted upon the base or platform for oscillatory movement in a longitudinal vertical plane and a pitman extending from the lower end of said lever beneath the plane of the base or platform to the propelling mechanism, said seat being provided with depending chairs, the base or platform having parallel longitudinal guide bars for sliding engagement of said chairs, and a bolt carried by the seat for selective engagement with a series of openings in the base or platform.

In testimony whereof, I affix my signature, in the presence of two witnesses.

THOMAS W. SPAULDING.

Witnesses:
SUSIE W. MARSHALL,
RICHARD M. DUVALL.